Patented Sept. 17, 1940

2,214,784

UNITED STATES PATENT OFFICE 2,214,784

PROCESS AND REAGENT FOR RESOLVING EMULSIONS

Truman B. Wayne, Houston, Tex.

No Drawing. Application July 29, 1938,
Serial No. 222,058

14 Claims. (Cl. 252—332)

This invention relates to the art of resolving petroleum emulsions of the character commonly encountered in the production, handling and refining of petroleum.

The principal object of this invention is to provide an improved process and reagents for treating petroleum emulsions to separate them into their component parts of oil and water.

Another object is to provide a novel product or reagent particularly one of the modified alkyd resin type, but which is so modified as to be water-wettable in order to enable its employment as a demulsifier, or for such uses where water-wettable properties and characteristics are necessary or desirable.

Further objects will appear from the following, in which the reagents and the processes for their employment will be described as related to their employment for the treating of petroleum emulsions.

The present invention is based on the discovery that valuable reagents and particularly modified synthetic resins that are suitable for petroleum dehydration can be prepared from the liquid resin obtained from pine during the digesting of pine wood to wood pulp. This liquid resin is commonly known as "tall oil", or "tallol" (Ellis, Chemistry of Synthetic Resins, 1935, vol. 1, pages 754–755). Owing to its high content of unsaturated bodies and unsaponifiable (but otherwise chemically reactive) constituents, it readily undergoes certain condensing and/or polymerizing reactions to produce resinous or semi-resinous bodies.

Crude tallol varies somewhat in composition, but an approximate average of its constituents is indicated as follows:

| | Per cent |
|---|---|
| Resin acids (abietic, etc.) | 30–45 |
| Fatty acids (oleic, linoleic, linolenic) | 45–60 |
| Unsaponifiable constituents | 4–12 |

The resin acids crystallize from tallol at ordinary temperatures but will readily go into solution when the mixture is warmed. Re-crystallization is often slow if all crystal nuclei are melted prior to cooling, so the material may readily be handled in a homogeneous state.

The fatty acids are all of unsaturated nature. The linoleic and linolenic acids possess two double bonds, hence readily undergo addition and polymerization reactions. Hydroxylation of these acids is readily accomplished by blowing them with moist air, sulfation followed by hydrolysis, and other conventional procedures.

These hydroxylated derivatives readily react with polycarboxy acids and their respective anhydrides to form resinous bodies. Even in their original unsaturated state they react through their carboxyl groups with polyhydric alcohols, hydroxy-amines, etc., to produce hydroxylated and/or aminic bodies which will react with resin-forming polycarboxy acids or anhydrides.

The more highly unsaturated fatty acids and also the resin acids undergo reactions akin to the diene synthesis, hence can be reacted with maleic anhydride and other substances having the $\alpha\beta$, -enal group to form adducts having all carboxyl and/or aldehyde groups still intact.

Crude tallol contains pitchy substance in the unsaponifiable content. By distillation much of the original unsaponifiable matter can be removed. However, additional unsaponifiable matter seems to be generated through polymerization by heating and oxidation during distillation. Fractional separation of the fatty acids and resin acids can be effected by distillation, selective saponification in an organic solvent followed by regeneration of the acid from the soap, or by esterification processes. I contemplate the use of the various fractions as well as the original material, whether crude or partially refined with or without substantial change from the crude state.

A number of tallol compounds suitable for petroleum demulsification are described in the following examples. However, it is to be understood that I do not confine myself to the specific chemicals, proportions, or procedures, set forth in these examples, as it will be readily apparent that these may be varied without departing from the spirit of this invention, or the scope of the appended claims.

In all of the following examples the solvent specified does not take part in the reactions, but facilitates the removal of water.

Example I 322 parts of tallol, 100 parts of solvent naphtha (B. P. 150–230° C.), and 95 parts of a high specific gravity resin grade of glycerol, are heated to 200° C. in the presence of 5 parts of 98% $H_2SO_4$. The heating is stopped when the yield of water, corrected for the water content of the glycerol and tallol, indicates that the mono-ester had been formed. 296 parts of phthalic anhydride are added and the temperature is maintained at 150–160° C. for from 4 to 8 hours. 120 parts of anhydrous isopropanol are then added and the mixture is heated under reflux to esterify the two carboxyls remaining on the two dibasic acid residues present in the molecule.

The above product is a neutral, oily, product, sufficiently wettable and dispersible in water to be of value as a petroleum demulsifier. It may be used without change, or may be sulfonated followed by conversion to a salt, ester, or amide.

Example II 322 parts of tallol, 100 parts of solvent naphtha, and 62 parts of monoethanolamine are mixed and heated at 100° C. for one hour to form the amine soap. To this soap is added 148 parts of phthalic anhydride and the heating is continued at 125° C. until the mono-phthalyl ester is formed. 60 parts of isopropyl alcohol are added and the mixture is refluxed at the boiling point (99–102° C.) for 4 hours to esterify the remaining carboxyl.

The above product is a neutral, oily, product, sufficiently wettable and dispersible in water to be of value as a petroleum demulsifier. It may be used without change, or may be sulfonated followed by conversion to a salt, ester, or amide.

Example III

The same as Example II except that instead of the monoethanolamine soap, the amide is used. This may be prepared by heating the soap to dehydrate it before condensing with phthalic anhydride.

Example IV

The di-tallol amide of monoethanolamine is prepared by heating 644 parts of tallol, 62 parts of monoethanolamine, 100 parts of solvent naphtha, and 7 parts of 98% $H_2SO_4$ to 155° C. where water formation begins. The temperature is raised gradually to promote the amide formation, and at 200–210° C. the reaction is complete.

This di-tallol amide of monoethanolamine is of considerable value in petroleum dehydration when used in either the unsulfonated or sulfonated state.

Example V

The di-tallol amide of monoethanolamine is prepared according to directions given in Example IV, and is then condensed with either one or two molecular equivalents of phthalic anhydride or sulfo-phthalic anhydride in the usual manner.

Example VI

A complex, resinous, derivative of tallol may be prepared by heating 644 parts of tallol, 140 parts of triethanolamine, 100 parts of solvent naphtha, and 10 parts of 98% $H_2SO_4$ until 16 parts of water, derived from esterification of one hydroxyl of the alkylolamine, have been collected. This may be accomplished at temperatures ranging between 150°–175° C. By this procedure one molecular equivalent of the tallol forms a soap with the tertiary alkylolamine, while the second molecular equivalent of tallol esterifies one of the hydroxyl groups.

The complex ester-amine soap is then condensed with 148 parts of phthalic anhydride at 135-150° C. so that one free carboxyl and one free hydroxyl still remain intact on the molecule. The carboxyl may be esterified by heating with isopropanol, or may be neutralized to form a salt, or may be converted to an amide.

Example VII

Same as Example VI except that the mass is heated to 150–200° C. to cause the residual carboxyl and hydroxyl groups, respectively, to esterify, yielding 16 to 18 parts of water. This procedure prepares a more resinous product than the product described in the preceding example.

Example VIII

Because of the highly unsaturated nature of most of the resin and fatty acids present in tallol, it readily undergoes the Diels-Alder reaction with substances having the $\alpha\beta$-enal grouping

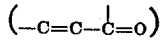

A complete disclosure of a variety of highly efficient petroleum demulsifiers prepared according to these principles are disclosed in my co-pending application, Serial No. 152,277, filed July 6, 1937. However, products of this same general description can be prepared from the very cheap and abundantly available tallol, and are herein specifically claimed as an extension and improvement relating to the co-pending application described above.

644 parts of tallol, 98 parts of maleic anhydride and 200 parts of sulfur dioxide extract obtained from the refining of petroleum distillates, are mixed and heated at 135° centigrade for 7 hours to form an addition product between the unsaturated constituents of the tallol and the $\alpha\beta$-enal groups of the maleic anhydride. The resulting "adduct" has its carboxyl groups derived from the tallol and its anhydride radical from the maleic anhydride, still intact. 624 parts of castor oil are added and the heating is conducted at 150–160° C. for from 4 to 8 hours. The anhydride radical of the "adduct" esterifies one available hydroxyl of the castor oil without the formation of water. The remaining carboxyl and one hydroxyl of the castor oil remain intact.

Example IX

Same as Example VIII except that after adding the castor oil, the heating is continued at 190–210° C. until from approximately half to complete esterification occurs between the remaining carboxyl and hydroxyl groups, respectively.

The products prepared according to the preceding disclosures may be sulfonated by any of the conventional procedures using concentrated sulfuric acid, oleum, pyrosulfuric acid, sulfur trioxide, etc. Due to the unsaturated nature of tallol, sulfonation may in certain instances be accomplished through the formation of bisulfite addition products by the use of sodium bisulfite, etc.

Sulfonation, however, is not necessary in all cases, and, in fact, emulsions are frequently encountered where the non-sulfo derivatives are preferable.

Example X

The simpler sulfonated derivatives of tallol are likewise of value as petroleum demulsifiers. Tallol polymerizes and sulfonates when subjected to sulfonating agents, yielding products which are sufficiently hydrophilic in nature to be of value.

As a specific example, 325 parts of tallol are sulfonated at a temperature between 0° C. and 40° C. with an excess of concentrated sulfuric acid or oleum. Owing to polymerization reactions, it is well to conduct the sulfonation in the presence of an inert solvent which may be distilled from the mixture after removal of the excess sulfuric acid by washing successively with water and sodium sulfate solution, or it may be allowed to remain as a diluent.

The polymerized, sulfonated derivative of tallol may be used as a petroleum demulsifier without further treatment, but usually is converted to an alkali-metal, ammonium, or amine salt, or to an ester by esterification with an alcohol. The ammonium salt or the amine salt may be dehydrated by the procedures disclosed in previous examples to yield the sulfonamide or the N-alkyl, N-aryl, or N-aralkyl sulfonamide derivative. The remaining carboxyl group may be similarly neutralized or aminated, but usually is left intact since the sulfonic group or its neutralized equivalent, or the sulfonamide group, provides sufficient polar properties to the modified tallol product.

The tollol derivatives described in the preceding example may be prepared at very low cost owing to the utilization of the paper industry by-product, tallol, and are therefore of value in the commercial resolution of petroleum emulsions. The cost of tallol is only a fraction of the cost of most of the other available raw materials generally employed in the manufacture of such products.

While the term "tallol" has been used in the preceding examples, it is understood that modification of the fatty or hydrocarbon chains of the tallol constituents is contemplated, and the various modified products are suitable for my purpose as raw material, as long as they bear a simple genetic relationship to the parent material. For instance, tallol may be hydroxylated by blowing with moist air at elevated temperatures, at atmospheric or increased pressures. The presence of these hydroxyl groups will then obviate the necessity for preparing fractional esters with glycols, glycerol, etc., for the purpose of obtaining hydroxyl groups to be used in the subsequent condensation with a polycarboxy acid. Other forms of modification such as sulfonation may be employed. In such cases either the sulfo or carboxyl groups, or both, may be esterified or aminated to provide hydroxyl groups.

For condensing with these tallol compounds, various polycarboxy acids are suitable. These may be selected from the group comprising phthalic, terephthalic, succinic, citric, maleic, fumaric, adipic, tartaric, oxalic, pimelic, suberic, azelaic, sebacic acids, or their anhydrides.

Various amines are suitable for my purpose. Among these are the alkylolamines such as monoethanolamine, diethanolamine, and the corresponding primary and secondary amines higher in the homologous series. One may also employ the various non-hydroxy alkylamines, aralkylamines, alicyclic and hydroaromatic amines when the hydroxylation of the molecule has been otherwise provided; for instance, through the use of hydroxy-acids or even a polyhydroxy amino body. Moreover, hydroxylation of these amines is readily accomplished by reacting them with suitable glycol or glycerol chlorohydrins, alkylene oxides, etc.

The above examples are only a few of the many products which may be prepared according to the principles disclosed in the foregoing discussion. While sulfonation is preferably done on one or more of the reacting constituents or ingredients prior to formation of the final, complex, resinous or semi-resinous product, it should be readily understood that sulfonation may be applied to the final product.

Various examples of the many products which answer the descriptions herein made are contemplated. Some may be oil soluble, others water soluble. In many instances they may possess dual solubility to an appreciable extent. Even apparent insolubility is of no consequence, as the products are all soluble at least to the extent necessary for segregation at the emulsion interface as a water-wettable colloid. The suitability of any of these products to the breaking and resolving of any given emulsion can readily be determined by the conventional procedures now in general use in oil fields and in laboratories which make such determinations.

Where reference is made to "sulfo" groups, it is understood that these include $OSO_3H$ and $SO_3H$ groups, and their neutralization products.

Where reference is made to polycarboxy acids in the appended claims, it is understood that this term is meant to also include the corresponding anhydrides, as will be noted by reference to the examples hereinbefore given.

The term "water-wettable" as used in the specification and claims refers to the characteristic of the product which enables it to be readily wetted by water and which is usually accompanied by some degree of hydration of the product in contact with the aqueous phase of the emulsion. When the product segregates at the interface of the emulsion and is adsorbed at the interfacial film where the hydrophobe body responsible for the emulsion exists, the water-wettable property of this product counteracts the effect of the hydrophobe present in the emulsion and thus effects its resolution.

The term "water-soluble" is used to include the property of forming colloidally hydrated aqueous solution. From the following paragraph it will be seen that only a limited degree of actual "water solubility" is necessary for the reagents used for breaking petroleum emulsions, for the reason that extremely small proportions of the reagents are ordinarily used.

The term "oil soluble" is used to include the property of colloidal dispersion in the oil phase.

The improved treating agents prepared in accordance with the present invention are used in small percentages, viz., in the proportion of one part of treating agent to form 2,000 to 20,000 parts (or, in some cases, as high as 30,000 parts) of petroleum emulsion, either by adding the concentrated product directly to the emulsion or after diluting with water or oil in the conventional manner. The treating agents may be used in any of the numerous ways commonly employed in the treatment of petroleum emulsions as will be apparent.

I claim:

1. A petroleum demulsifying composition which comprises as a component part a modified alkyd resin condensation product of the general type $P_n.A_n.T_n$ wherein P is a carboxylic acid residue derived from the unsaturated fatty and resin acids obtained from pine; A is a hydroxy alkyl compound; T is a polycarboxy acid residue; and $n$ is the number 1 or more.

2. A petroleum demulsifying composition which comprises as a component part a modified alkyd resin condensation product of the general type $P_n.A.T_n.E_n$, wherein P is a carboxylic acid residue derived from the unsaturated fatty and resin acids obtained from pine; A is a polyhydric alcohol residue; T is a polycarboxy acid residue; E is a radical selected from a group comprising an ester and an amino radical; and $n$ is the number 1 or more.

3. A petroleum demulsifying composition which comprises as a component part a modified alkyd resin condensation product of the general type $P_n.A.T_n.E_n$, wherein P is a carboxylic acid residue derived from the unsaturated fatty and resin acids obtained from pine; A is an alkylolamine residue; T is a polycarboxy acid residue; E is a radical selected from a group comprising an ester and an amino radical; and $n$ is the number 1 or more.

4. A petroleum demulsifying composition which comprises as a component part a condensation product of the general type

wherein P is a carboxylic acid residue derived from the unsaturated fatty and resin acids obtained from pine; and $N-C_nH_{2n}OH$ is an alkylolamine radical derived from a primary alkylolamine.

5. A petroleum demulsifying composition which comprises as a component part a modified alkyd resin condensation product of the general type

wherein P is a carboxylic acid residue derived from the unsaturated fatty and resin acids obtained from pine; $N-C_nH_{2n}$ is an alkylolamine residue, and T is a polycarboxy acid residue.

6. A petroleum demulsifying composition which comprises as a component part a modified alkyd resin condensation product of the general type

wherein P is a carboxylic acid residue derived from the unsaturated fatty and resin acids obtained from pine;

is an alkylolamine residue, and T is a polycarboxy acid residue.

7. A petroleum demulsifying composition which comprises as a component part a modified alkyd resin condensation product of the general type

wherein P is an unsaturated carboxylic acid residue derived from the unsaturated fatty and resin acids obtained from pine; T is a polycarboxy acid residue chacracterized by the presence of an $\alpha\beta$-enal group; and A is a residue from a hydroxyalkyl compound which esterifies the carboxyl groups of the polycarboxy acid residue.

8. The process of treating petroleum, comprising, treating petroleum with a small percentage of a petroleum demulsifying composition having as a component part a modified alkyd resin condensation product of the general type $P_n.A_n.T_n$, wherein P is a carboxylic acid residue derived from the unsaturated fatty and resin acids obtained from pine; A is a hydroxy alkyl compound; T is a polycarboxy acid residue; and $n$ is the number 1 or more.

9. A petroleum demulsifying composition which comprises as a component part a product of the general type P.Z.E, wherein P is a residue derived from the unsaturated fatty and resin acids obtained from pine; Z is a residue from a sulfo group; and E is selected from a group comprising hydrogen, an alkali-metal and ammonium, amino, and ester radicals.

10. The process of treating petroleum, comprising, treating petroleum with a small percentage of a petroleum demulsifying composition having as a component part a product of the general type P.Z.E, wherein P is a residue derived from the unsaturated fatty and resin acids obtained from pine; Z is a residue from a sulfo group; and E is selected from a group comprising hydrogen, an alkali-metal and ammonium, amino, and ester radicals.

11. A petroleum demulsifying composition which comprises as a component part a derivative of tallol which is water-wettable, interfacial and surface-active.

12. A petroleum demulsifying composition which comprises as a component part a sulfonated derivative of tallol which is water-wettable, interfacial and surface-active.

13. A petroleum demulsifying composition which comprises as a component part a water-wettable, interfacial and surface-active condensation product of the modified synthetic resin type derived from tallol and one or more reactive resin-forming bodies.

14. The process of treating petroleum, comprising, treating petroleum with a small percentage of a petroleum demulsifying composition having as a component part a derivative of tallol which is water-wettable, interfacial and surface-active.

TRUMAN B. WAYNE.